United States Patent
Rahja et al.

(10) Patent No.: US 8,788,638 B2
(45) Date of Patent: Jul. 22, 2014

(54) METHOD AND ARRANGEMENT FOR REGISTERING A USER

(75) Inventors: Petri Oskari Rahja, Espoo (FI); Timo Johannes Rinne, Helsinki (FI)

(73) Assignee: P2S Media Group Oy, Helsinki (FI)

( * ) Notice: Subject to any disclaimer, the term of this patent is extended or adjusted under 35 U.S.C. 154(b) by 127 days.

(21) Appl. No.: 13/372,858

(22) Filed: Feb. 14, 2012

(65) Prior Publication Data

US 2013/0046837 A1    Feb. 21, 2013

(30) Foreign Application Priority Data

Feb. 15, 2011   (FI) .................................. 20115141

(51) Int. Cl.
*G06F 15/177* (2006.01)
(52) U.S. Cl.
USPC ............................................................ 709/222
(58) Field of Classification Search
USPC ............................................................ 709/222
See application file for complete search history.

(56) References Cited

U.S. PATENT DOCUMENTS

| | | | | |
|---|---|---|---|---|
| 7,865,611 | B2* | 1/2011 | Sakamoto | 709/232 |
| 8,060,070 | B2* | 11/2011 | Lazaridis | 455/417 |
| 2004/0046868 | A1 | 3/2004 | Anderson | |
| 2004/0218045 | A1 | 11/2004 | Bodner | |
| 2005/0075895 | A1* | 4/2005 | Mohsenin et al. | 705/1 |
| 2007/0016613 | A1 | 1/2007 | Foresti | |
| 2008/0096537 | A1* | 4/2008 | Milojkovic et al. | 455/418 |
| 2010/0298011 | A1* | 11/2010 | Pelley et al. | 455/466 |

FOREIGN PATENT DOCUMENTS

EP   1445702 A1   11/2004

OTHER PUBLICATIONS

Extended European search report issued concerning the patent application No. 12154419.1-2413 Dated Jun. 18, 2012.

* cited by examiner

*Primary Examiner* — Lance L Barry
(74) *Attorney, Agent, or Firm* — Ziegler IP Law Group, LLC

(57) ABSTRACT

A method, computer arrangement and computer program product for creating a user account for a content management service is executable in a server computer and accessible through a network, e.g. a wireless network. The method involves receiving a mail message containing valid input data of a new content submission transaction of the content management service, storing the input data in the service to initiate a new user account creation process, and sending a reply mail message to the sender of the mail message. The reply mail message may include a computer executable instruction for continuing the user account creation process and/or amending the input data of the content submission transaction, or receiving a second message and continuing the user account creation process and/or the amending of the input data of the content submission transaction using the data of the second message.

15 Claims, 4 Drawing Sheets

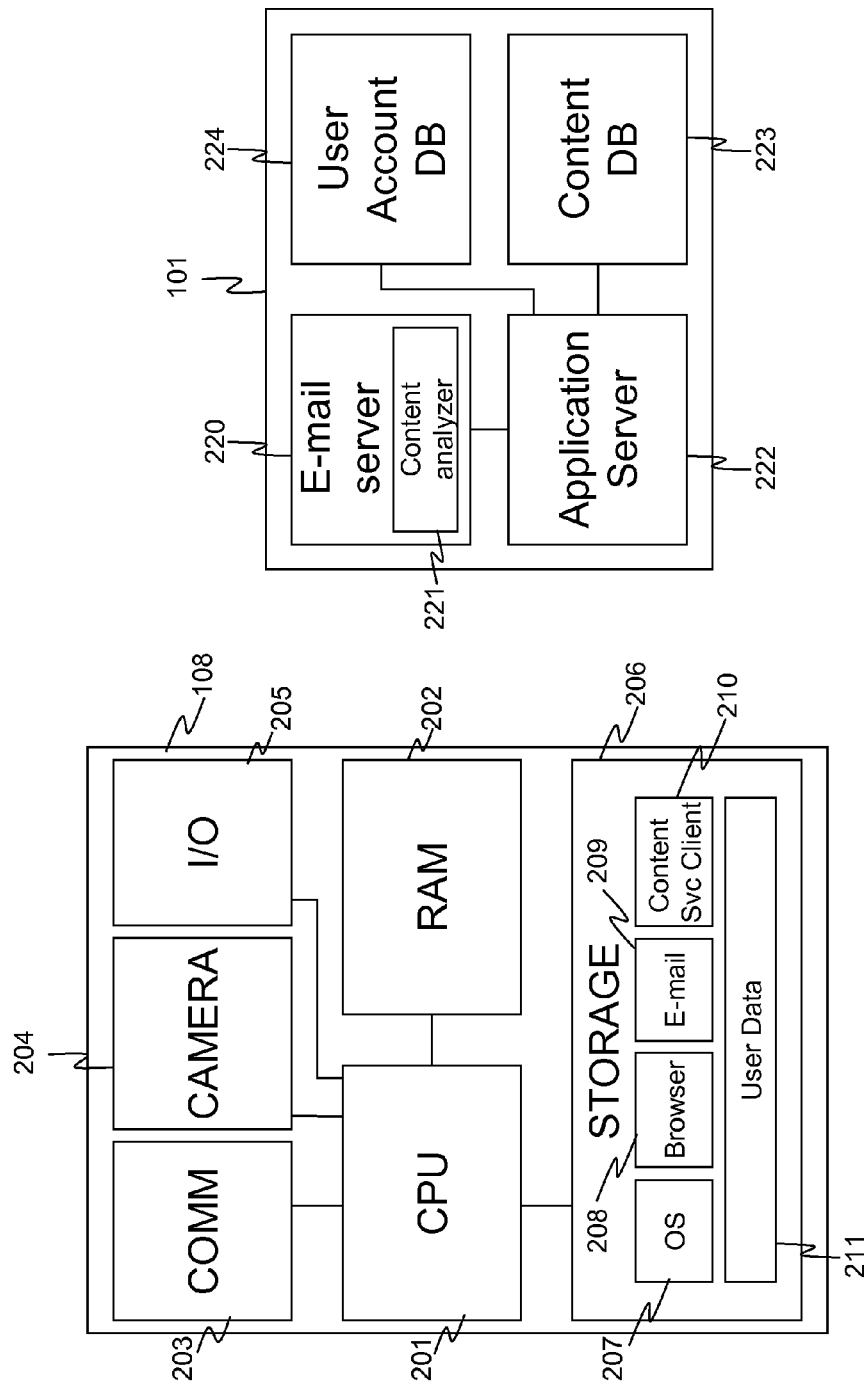

METHOD AND ARRANGEMENT FOR REGISTERING A USER

TECHNICAL FIELD

The aspects of the disclosed embodiments relate to a method and arrangement for establishing a new user account for a web service.

BACKGROUND

Mobile terminals have typically means for creating multimedia data. For example, the terminals have camera and voice recording means for producing still images and/or streaming voice or video data. The terminals also have program code, e.g. an e-mail client program for sending the created content to the internet e.g. via an e-mail account.

Services exist in networks, e.g. the Internet, for managing data, e.g. multimedia data, received from mobile terminals. The services are typically accessed via a web browser or using a client application made specifically for the purpose of accessing the service.

If the service is accessed via web browser of a mobile terminal, the functionality of the service cannot utilize directly the hardware resources, e.g. the camera, of the mobile terminal. For example, an image shot using the camera of the terminal cannot be sent to the service using browser interface in any particularly straightforward manner. A special client application is needed for such functionality. On the other hand, starting to use the special client application requires additional steps of searching the client application and installing the application. Those steps may be too labor intensive especially in use scenarios, where a new, previously unregistered user needs the service immediately and does not have time to first subscribe to the service. One such use scenario occurs, when the user shoots a photo he/she wants to put the photo immediately for sale at a commercial photo distribution site which provides a marketplace for the photos.

A need exists for a method of providing a network-based service to a new user in a manner where the initial use of the service is as simple and straightforward as possible and where the user is able to complete the first use of the service as well as the service registration later.

It would be advantageous to provide a method for efficient establishment of a new user account especially from a mobile terminal, e.g. a cellular phone.

SUMMARY

An aspect of the disclosed embodiments is a method for creating a user account for a content management service executable in a server computer and accessible through a network, e.g. a wireless network. The method may comprise any, any combination or all of the steps of receiving in the server computer a mail message comprising data identifiable as valid input data of a new content submission transaction of the content management service; storing the input data in the service to initiate a new user account creation process; sending a reply mail message to the sender of the mail message, the reply mail message comprising at least one computer executable instruction for continuing the user account creation process and/or amending the input data of the content submission transaction; receiving a second message comprising data for continuing the user account creation process and/or for amending the input data of the content submission transaction; continuing the user account creation process and/or the amending of the input data of the content submission transaction using the data of the second message.

The data identifiable as input data of a content submission transaction of the service may comprise e.g. a digital still image or streaming data and/or electronic mail address of the sender.

The input data may be published to at least one second user of the service. In an embodiment, the data is published to the second user before the completion of the registration process of the user. The data may be published without any identifying information about the user. The second user may make priority reservation to the input data. A priority reservation may trigger a reminder message, e.g. an e-mail message or a SMS message, to the user who sent the input data about completing the registration process and/or amending the input data of the content submission transaction.

In an embodiment, the mail message received by the server may comprise a valid electronic mail address.

In an embodiment, the mail message may comprise a syntactically valid but non-existing electronic mail address. Such address may identify e.g. only the domain name of a web site. The receipt of an e-mail message may trigger the step of searching the content of the message for data identifiable as valid input data for the service. The detection of valid input data may trigger the step of forwarding the received mail message to e.g. an existing electronic mail account or to the content management service.

The step of storing the input data in the service may comprise any of the steps of assigning a unique identifier to the input data and creating a temporary account associated with the input data.

The reply mail message sent to the mobile device may comprise computer executable instructions or reference, e.g. a URL, to such instructions, for installing a computer software program executable in the memory of the mobile device. The computer software program may comprise computer executable instructions for gathering information from the mobile device and/or about the user and sending the gathered information to the server computer for the purpose of continuing the registration process. In an embodiment, the information comprises the current geographical location of the mobile terminal.

Another aspect of the disclosed embodiments is an arrangement comprising a server computer and accessible through a network for creating a user account for a content management service. The arrangement is characterized in that it comprises any or any combination of the means for receiving in the server computer a mail message comprising data identifiable as valid input data of a new content submission transaction of the content management service; storing the input data in the service to initiate a new user account creation process; sending a reply mail message to the sender of the mail message, the reply mail message comprising at least one computer executable instruction for continuing the user account creation process and/or amending the input data of the content submission transaction; receiving a second message comprising data for continuing the user account creation process and/or for amending the input data of the content submission transaction; and continuing the user account creation process and/or the amending of the input data of the content submission transaction using the data of the second message.

Yet another aspect of the disclosed embodiments is a computer program product executable in a server computer for creating a user account for a content management service. The computer program product is characterized in that it comprises computer executable instructions for any or any combination of receiving in the server computer a mail message comprising data identifiable as valid input data of a new content submission transaction of the content management service; storing the input data in the service to initiate a new user account creation process; sending a reply mail message to the sender of the mail message, the reply mail message comprising at least one computer executable instruction for continuing the user account creation process and/or amending the input data of the content submission transaction; receiving a second message comprising data for continuing the user account creation process and/or for amending the input data of the content submission transaction; and continuing the user account creation process and/or the amending of the input data of the content submission transaction using the data of the second message.

Some aspects of the disclosed embodiments are described herein, and further applications and adaptations thereof will be apparent to those of ordinary skill in the art.

BRIEF DESCRIPTION OF DRAWINGS

In the following, the aspects of the disclosed embodiments are described in greater detail with reference to the accompanying drawings in which FIG. 2a shows a schematic diagram of a mobile terminal according to an embodiment, FIG. 2b shows a schematic diagram of server software according to an embodiment.

DETAILED DESCRIPTION OF THE DRAWINGS

Figure 1:
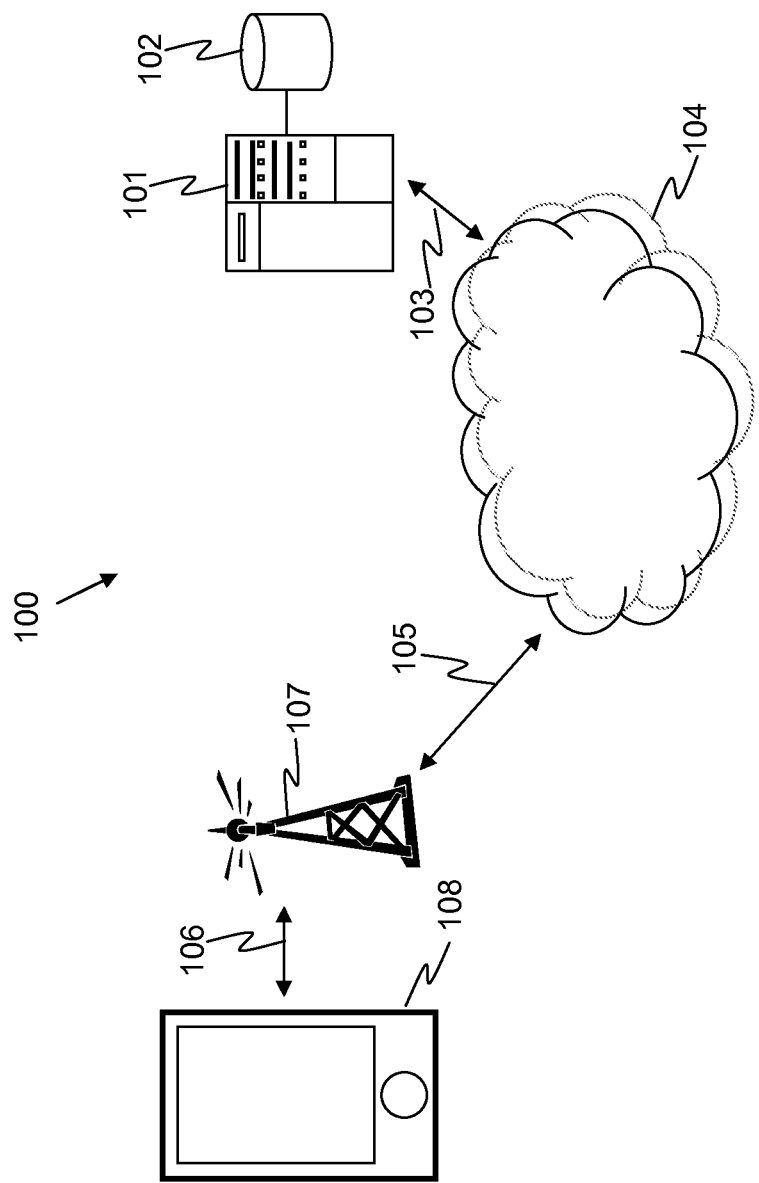
FIG. 1 shows an exemplary network arrangement according to an embodiment.

FIG. 1 depicts an exemplary arrangement 100 according to an aspect of the disclosed embodiments. The arrangement has at least one server 101 having a persistent data storage 102. The server is communicatively connected 103 to a data communication network 104, e.g. the Internet. The server 101 provides services accessible via the network. Those services may comprise e.g. electronic mail service, storage services for content created by users of the service, location services for assigning a geographical location information to the content, search services for searching the content provided by the users of the service, matching services for establishing a link between a user producing content and a user willing to purchase content, payment services for executing a payment transaction between two users of the system and software download service for providing software to mobile terminals of the system. The services may be provided by one server or they may be provided, e.g. for scalability and/or availability reasons, by a plurality of servers.

The arrangement further comprises at least one mobile terminal 108, e.g. a mobile phone, preferably a smart phone comprising a camera and some suitable messaging application, e.g. SMS, MMS and/or e-mail. Additionally, the phone has access to the data communication network 104 e.g. via a radio communication connection 106 over a base station 107 which is connected 105 to the data communication network. The mobile terminal 108 comprises means for downloading computer executable software to the storage device of the terminal and for installing the downloaded software in the terminal device.

The functional components of the mobile terminal 108 are depicted in more detail in FIG. 2a. The terminal comprises a Central Processing Unit 201 which executes computer executable instructions of various software programs and has access to Random Access Memory 202 of the terminal. The terminal also has communication means 203, e.g means to access 3G and/or Wireless radio networks, a camera 204 which is capable of producing still images and/or video streams, and I/O devices such as a display and a keyboard. In an embodiment, at least part of the keyboard may be integrated into a touch screen display. Finally, the device has a persistent memory storage 206 for storing both software (e.g. operating system 207, browser software 208, e-mail client software 209 and user downloadable software, e.g. a client software 210, implementable e.g. using Java™, for using the content management service of an embodiment of the present disclosure. The storage device is also capable of storing user data 211, e.g. still images and/or videos shot by the user of the terminal using the camera 204.

FIG. 2b shows some functional components of the server 101 of an arrangement in accordance with an embodiment of the disclosure. The server comprises an e-mail server process 220, which receives e-mail messages sent from the terminals 108 via the network 104. The server advantageously has a content analyzer module 221, which checks if the content of the received message meets the criteria that are set for new content data of the service. The content analyzer module may for example check, if the e-mail message contains a valid still image or a video stream. The valid content data received by the e-mail server is then sent to an application server 222, which provides application services e.g. relating to the user accounts 224 and content 223 of the content management service.

Figure 3B:
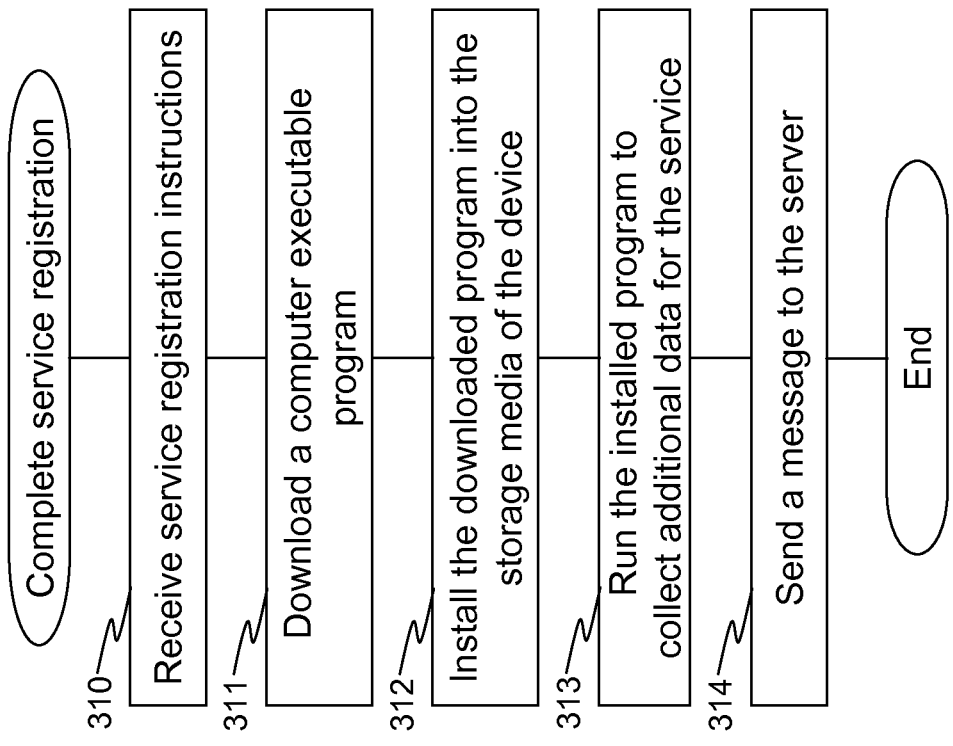
FIG. 3b shows an exemplary flow chart about completing a service registration according to an embodiment.
Figure 3A:
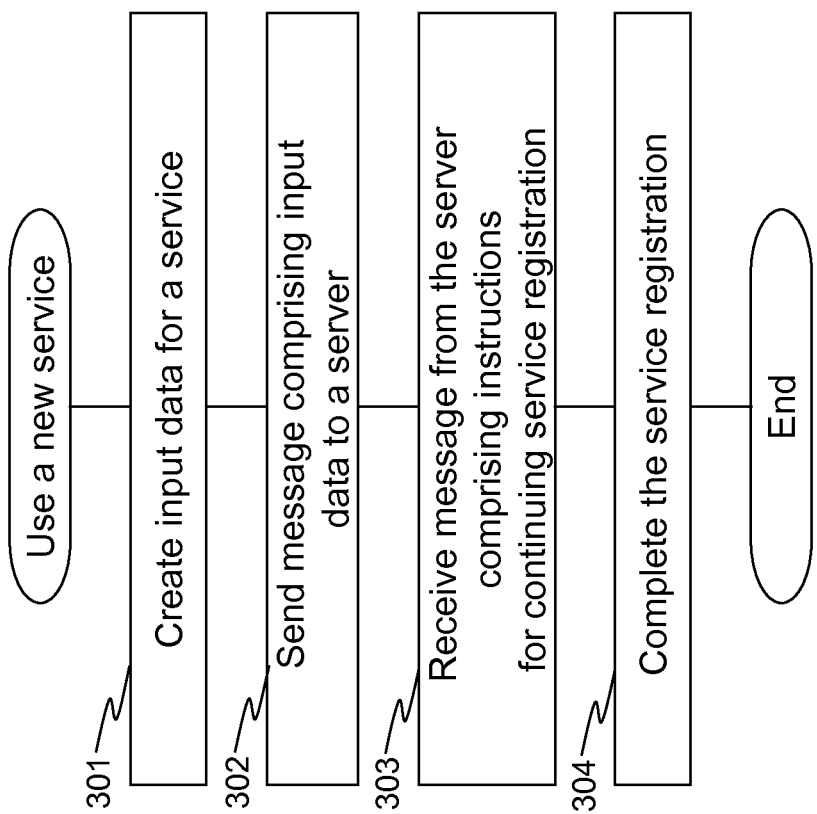
FIG. 3a illustrates an exemplary flow chart about an unregistered user using a new service according to an embodiment.

FIG. 3a illustrates in a form of an exemplary flow chart a method of using a content management service for the first time as a yet unregistered user. The user of the terminal 108 shoots a picture, which the user wants to send to an image database e.g. for commercial utilization. The shot picture is valid, but incomplete, input data 301 for a service, e.g. a commercial photo distribution service. The terminal 108 of the user has a functional feature of sending a recently shot still image to some e-mail address associable with the service. The terminal device thus sends an e-mail message essentially containing only the shot picture to a server of the service. The e-mail address may be an existing e-mail address or an address that is only partially valid, e.g. containing information sufficient for identifying a domain but not an account within the domain. The service has now received new input data, i.e. a still picture, from a previously unknown user. In order to fully utilize the picture, the service must receive more information e.g. about the picture, about the person who shot the picture and about the terms of use, e.g. the sale price of the picture. For the purpose of obtaining the additional data about the picture and to add the user as a new user of the service, the server sends a message 303 to the terminal device for continuing the service registration process. The terminal, upon receipt of the message, executes the instructions of the message to complete the service registration 304.

FIG. 3b shows in more detail the process of completing the service registration. The terminal receives 310, e.g. in a form of an e-mail message, instructions for continuing the service registration. In a preferred embodiment, the instructions comprise instructions for downloading a computer executable program 311 from a server and installing 312 the program into the storage media of the terminal. The program, which is advantageously the client software of the service, is then executed 313 in the memory of the mobile terminal 108. The program may execute instructions for example for completing the registration of the new user and amend the input data that has already been sent to the server 101. The completion of the registration of the new user may comprise for example steps of requesting the name and contact information of the user, payment information, e.g. credit card information, and preference information. Amending the input data (e.g. a photo) may comprise for example recording the current location of the terminal device or adding any other relevant metadata, e.g. name of the location where the picture was shot or name of the person shown in the picture, to the input data.

In an embodiment, the instructions for completing the service registration comprise a URL of a web service which provides the functional features needed for completing the service registration and/or amending the input data.

Figure 4:
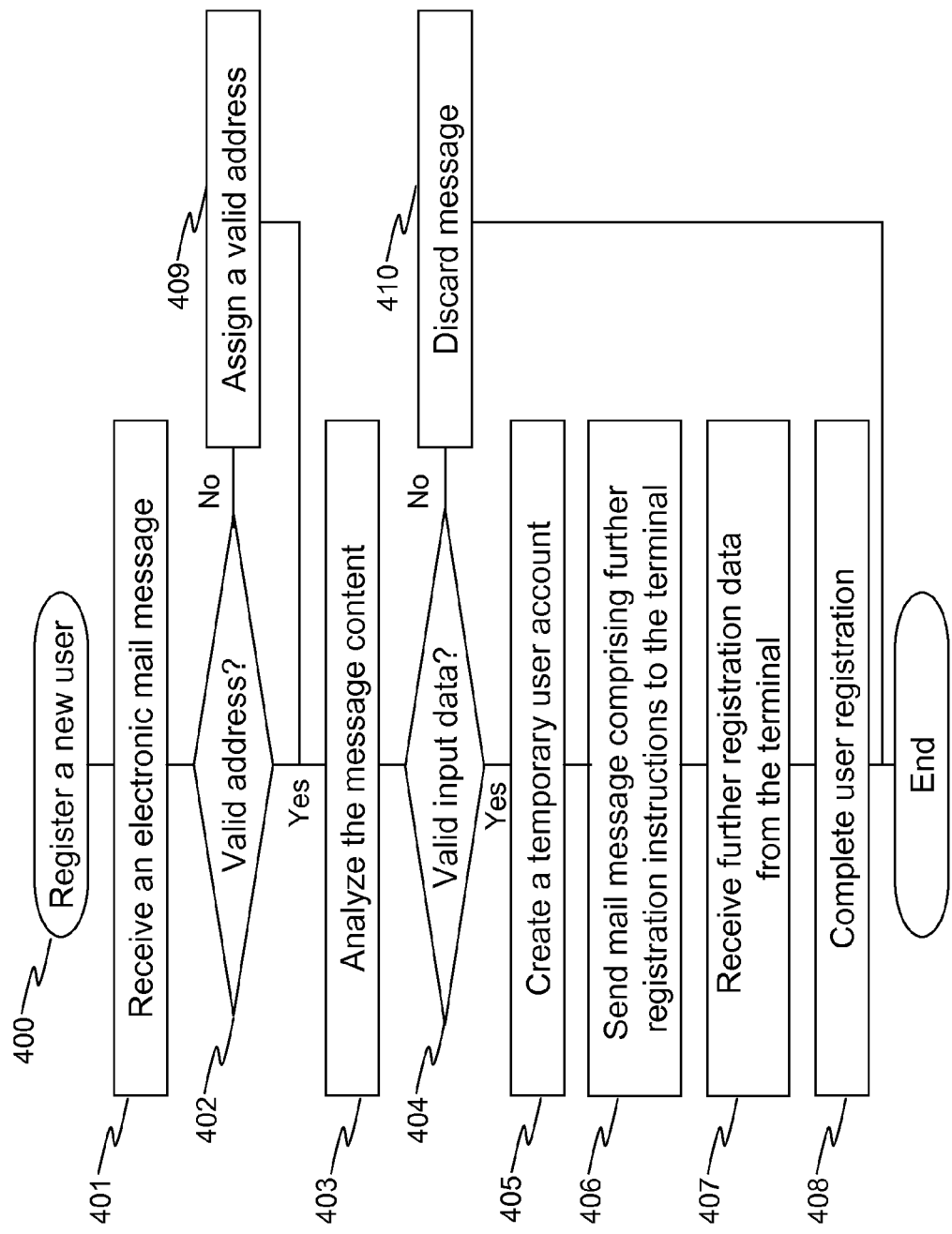
FIG. 4 depicts an exemplary flow chart about registering a new user in the server according to an embodiment.

FIG. 4 shows a flow chart about an exemplary method of registering a new user 400 executable in the server computer according to one embodiment. The e-mail server process 220 of the server computer receives an electronic mail message 401. The e-mail server then checks if the e-mail address is a valid address 402. If the address does not correspond to any existing e-mail account, then the server assigns a default address 409 which belongs to an account accessible by the application server 222. Then the message content is analyzed 403 by the content analyzer 221 for validity of the data as input data of the content management service. For example, the content analyzer may check if the mail message contains a recently shot still image or a video stream. The content analyzer may also check, if the quality of the image or stream is high enough for any commercial purpose. The content analyzer may also amend the meta data of the input data e.g. with data characterizing the quality of the image or stream. If the data is not deemed valid in step 404, the message is discarded 410. An error message may be sent to the terminal device 108, from which the message was sent. If the input data was deemed valid, then the input data is stored in the content database 223 and a new temporary user account is created 405 in the user account database 224. Then, a message, preferably an e-mail message, is sent 406 to the terminal 108. The message may contain e.g. instructions for downloading and installing a client application 210 to the data storage terminal device 108. The instructions are advantageously at least partially computer executable. Next, the application server 222 receives further registration data and/or amendments to the input data 407 from the terminal 108. Finally, the server completes the user registration 408 and the first content submission transaction of the user by updating data in the user account database 224 and/or in the content database 223.

In the above example, some steps may be performed also in different order. For example, the steps of checking the validity of the address 402 and assigning a valid address 409 may occur also after the steps of analyzing the message content 403 and checking the validity of the content 404. The assigned valid address may depend on the results of the content analysis. For example, still pictures may be sent to a different address than video streams.

To a person skilled in the art, the foregoing exemplary embodiments illustrate the model presented in this application whereby it is possible to design different methods and arrangements, which in obvious ways to the expert, utilize the inventive idea presented in this application.

The invention claimed is:

1. A method for creating a user account for a content management service executable in a server computer and accessible through a network, e.g. a wireless network, the method comprising:
   receiving in the server computer a mail message comprising data identifiable as valid input data of a new content submission transaction of the content management service,
   storing the input data in the service to initiate a new user account creation process,
   publishing the input data to at least one second user before completion of the new user account creation process,
   receiving a priority reservation, by the second user, to the input data in response to the publication of the input data,
   sending a reply mail message to the sender of the mail message, the reply mail message comprising at least one computer executable instruction for continuing the user account creation process and/or amending the input data of the content submission transaction,
   receiving a second message comprising data for continuing the user account creation process and/or for amending the input data of the content submission transaction, and
   continuing the user account creation process and/or the amending of the input data of the content submission transaction using the data of the second message.

2. A method according to claim 1, wherein the data identifiable as input data of a content submission transaction of the service comprises a digital still image or streaming data.

3. A method according to claim 1, wherein the received mail message comprises a syntactically valid but non-existing electronic mail address.

4. A method according to claim 3, wherein the receipt of the e-mail message triggers the step of searching the content of the message for data identifiable as valid input data for the service.

5. A method according to claim 4, wherein the searching of the content of the message resulting detection of valid input data triggers the step of forwarding the received mail message to e.g. an existing electronic mail account or to the content management service.

6. A method according to claim 1, wherein the step of storing the input data in the service comprises any of the steps of assigning a unique identifier to the input data and creating a temporary account associated with the input data.

7. A method according to claim 1, wherein the reply mail message sent to a mobile device comprises computer executable instructions or reference to such instructions for installing a computer software program executable in the memory of the mobile device.

8. A method according to claim 7, wherein the computer software program comprises computer executable instructions for gathering information from the mobile device and/or about the user and sending the gathered information to the server computer for the purpose of continuing the registration process and/or amending the input data.

9. A method according to claim 8, wherein the gathered information comprises the current geographical location of the mobile terminal.

10. A method according to claim 1, further comprising:
    transmitting a reminder message in response to the received priority reservation to the user sending the input data.

11. A method according to claim 10, wherein the reminder message relates to completing registration process and/or amending the input data of the content submission transaction.

12. A method according to claim 10, wherein the reminder message is transmitted after the reply mail message.

13. An arrangement comprising a server computer and accessible through a network for creating a user account for a content management service, wherein the arrangement is configured to:
- receive in the server computer a mail message comprising data identifiable as valid input data of a new content submission transaction of the content management service,
- store the input data in the service to initiate a new user account creation process,
- publish the input data to at least one second user before completion of the new user account creation process,
- receive a priority reservation, by the second user, to the input data in response to the publication of the input data,
- send a reply mail message to the sender of the mail message, the reply mail message comprising at least one computer executable instruction for continuing the user account creation process and/or amending the input data of the content submission transaction,
- receive a second message comprising data for continuing the user account creation process and/or for amending the input data of the content submission transaction, and
- continue the user account creation process and/or the amending of the input data of the content submission transaction using the data of the second message.

14. A computer program product executable in a server computer for creating a user account for a content management service, the program product comprises computer executable instructions for:
- receiving in the server computer a mail message comprising data identifiable as valid input data of a new content submission transaction of the content management service,
- storing the input data in the service to initiate a new user account creation process,
- publishing the input data to at least one second user before completion of the new user account creation process,
- receive a priority reservation, by the second user, to the input data in response to the publication of the input data,
- sending a reply mail message to the sender of the mail message, the reply mail message comprising at least one computer executable instruction for continuing the user account creation process and/or amending the input data of the content submission transaction,
- receiving a second message comprising data for continuing the user account creation process and/or for amending the input data of the content submission transaction, and
- continuing the user account creation process and/or the amending of the input data of the content submission transaction using the data of the second message.

15. A server computer for creating a user account for a content management service, the server computer comprises an e-mail server, an application server, a user account database and a content database, the server computer configured to:
- receive a mail message comprising data identifiable as valid input data of a new content submission transaction of the content management service,
- store the input data in the service to initiate a new user account creation process,
- publish the input data to at least one second user before completion of the new user account creation process,
- receive a priority reservation, by the second user, to the input data in response to the publication of the input data,
- send a reply mail message to the sender of the mail message, the reply mail message comprising at least one computer executable instruction for continuing the user account creation process and/or amending the input data of the content submission transaction,
- receive a second message comprising data for continuing the user account creation process and/or for amending the input data of the content submission transaction, and
- continue the user account creation process and/or the amending of the input data of the content submission transaction using the data of the second message.

* * * * *